Patented June 19, 1934

1,963,901

UNITED STATES PATENT OFFICE 1,963,901

LUBRICANT CONTAINING A CELLULOSE DERIVATIVE

Kenneth C. D. Hickman, Rochester, N. Y., assignor to Eastman Kodak Company, Rochester, N. Y., a corporation of New York No Drawing. Application April 17, 1931, Serial No. 531,007

5 Claims. (Cl. 87—9)

This invention relates to lubricants and the like, and more particularly to a lubricant having the character of a jelly or a grease and which contains a cellulose derivative, such as cellulose ether, cellulose acetate stearate, cellulose stearate, cellulose nitrate and the like, and an oil such as castor oil, rosin oil, sperm oil or the like, the viscosity of the oil being increased by the addition of these cellulose derivatives thereto.

In the manufacture of various cellulose derivative articles, it is common practice to add to the composition a softener or plasticizer for the cellulose compound, so that the composition, when dried or set, has increased flexibility or toughness over that of the cellulose derivative alone. Normally, the plasticizer is added in an amount equal to not more than 50% of the weight of the cellulose derivative being plasticized, and, as a matter of fact, in the case of a considerable majority of known plasticizers, the addition of more than 50% of the plasticizer to the composition results in crystallizing out or bleeding out of some or all of the plasticizer. Although it is common to add to certain oils, materials which "load" them, such as soaps and the like, no one has to my knowledge altered the properties therewith.

I have found, for instance, that certain oils, such as castor oil, rosin oil, sperm oil and the like are miscible in all proportions with cellulose ether and also that valuable jellies or compositions may be prepared by dissolving a relatively small percentage of cellulose ether in one of these oils. I have also found that the resulting jellies or pastes are very valuable as lubricants for the reason that their consistencies are relatively unaffected between the temperatures of zero degrees and 100° C.

In other words, the viscosity of these cellulose ether jellies and pastes does not change to any great extent over the usual range of temperatures to which lubricants are normally subjected. This is a very unusual and much desired property to attain in lubricants as it is common experience with even the layman that lubricants or greases employed in automobiles, for example, will at the hotter summer temperatures become so limpid as to be almost useless, and in the colder winter temperatures become so stiff or solid as to practically prevent the operation of the machinery which they are intended to lubricate.

It is, therefore, among the objects my invention to provide a lubricant which will maintain a relatively constant viscosity during the normal atmospheric temperatures to which it may be subjected and to provide a process for the preparation of such lubricants. It is a further object of my invention to prepare various jellies, pastes and the like from cellulose ether and an oil such as related herein. Other objects of my invention will become apparent upon a further perusal of this specification.

Cellulose ethers, such as employed by me in carrying out my invention are well known to those skilled in the art and are described in many previous patents and publications, notably the many patents and applications of Leon Lilienfeld. In general, these ethers are prepared by first mercerizing the cellulose, such as by the addition of the proper quantities of water and caustic alkali thereto, so as to produce an alkali cellulose. This alkali cellulose is then subjected to the action of an etherifying agent, such as ethyl chloride or ethyl sulphate, whereupon cellulose ether results. While I have had more or less success with the cellulose ethers in general I have found that that type of cellulose ether which is insoluble in water above 16° C. but which swells or dissolves in colder water is probably the best suited, where cellulose ether is to be employed.

In general, I have found that quantities of cellulose ether equalling from approximately 2 to 10% of the resulting composition may be incorporated with castor oil, rosin oil, or sperm oil to form the jellies or pastes herein referred to. Usually better products are obtained and the process is facilitated by first soaking the cellulose ether in the oil at atmospheric temperature for a period of several hours, for instance, as long as 24 hours prior to the dissolution of the cellulose ether in the excess of oil, which dissolution preferably takes place at a higher temperature.

I have found another striking thing with respect to the preparation of these lubricants, namely, that mineral oil up to an amount equal to the amount of castor oil employed may be incorporated in the cellulose ether lubricant composition and still obtain jellies or pastes which have valuable lubricating properties, and which, because of the low cost of mineral oil, are more economical than lubricants prepared from cellulose ether and castor oil alone.

I will now give several embodiments of my invention, although it will be understood that these are merely illustrative of the many ramifications of my invention, by which examples, of course, I do not intend that I shall be limited except in accordance with the claims appended hereto and forming a part hereof.

In preparing all of the following compounds, a more satisfactory product (in the sense that degradation is avoided) is obtained if the cellulose ether is soaked or pretreated overnight at room temperature with sufficient oil with which it is to be compounded to moisten it. By such pretreatment or soaking the cellulose ether granules or particles swell slightly, so that the incorporation of the ether with the remainder of the oil for the lubrication formula will take place readily by merely heating the soaked cellulose ether with the additional quantity of oil required for the composition. Assuming, therefore, that we have a batch of cellulose ether which has been soaked overnight at room temperature with enough castor oil to saturate it, I may take two parts of this swelled cellulose ether (based upon the weight of the ether before soaking) and incorporate it with 98 parts of castor oil (actual weight of oil after mixing) by mixing at a temperature of from 210° to 250° C. This solution, upon cooling, solidifies sharply at a temperature ranging between 160° C. and 100° C.

In the case of examples given by me, it is well to avoid excessive heating or oxidation in order to avoid degradation of the cellulose ether. A lubricant so prepared solidifies to a clear honey-colored jelly which will not flow even at temperatures close to 100° C. If this same procedure is carried out using 3 parts of cellulose ether and 97 parts of castor oil, there will result a firm honey-colored jelly having slight opalescence. If 4 parts of cellulose ether are compounded in this same manner with 96 parts of castor oil, a pale brown jelly having a conchoidal fracture will result. If 6 parts of ether are incorporated with 94 parts of castor oil a stiff brown jelly which tears away from the vessel upon cooling will result. Upon incorporation of 9 parts of cellulose ether with 91 parts of castor oil, a friable solid which becomes greasy when worked between the fingers will result. While I have stated that from 2 to 10 parts or percent of cellulose ether may be incorporated with the castor oil, it must not be understood that these are limits to my invention, as I have actually found that as high as 20 to 25% or even more of cellulose ether may be incorporated with castor oil in the manner described; depending somewhat upon the exact character of the cellulose ether employed which will be readily apparent to those skilled in the art upon working therewith; such a percentage of cellulose ether will give a sticky plastic which has utility, not only as a lubricant, but in some instances as a belt grip or the like.

One striking character of the foregoing compositions is that, by masticating the composition thoroughly, there will result a plastic which is temporarily more fluid than the composition was before mastication, but which, upon allowing to stand for several days, will gradually regain its original jellified texture. Obviously, of course, the higher the percentage of cellulose ether in the composition, the sooner it will reset and regain its original texture following its mastication.

An additional feature of my invention already alluded to is that I may incorporate with the cellulose ether-castor oil composition, either during the incorporation of the ether into the castor oil, or by mastication of the cellulose ether-castor oil composition, a quantity of mineral oil ranging from a few drops up to an amount equal to the amount of castor oil included in the composition. Obviously, the more mineral oil that is incorporated into the composition, or the less viscous the mineral oil, the less viscous will be the resulting lubricant. While the viscosity of a lubricant composed of a given number of parts of cellulose ether and a castor oil-mineral oil mixture will not be the same as that containing the same number of parts of castor oil alone, the viscosity of one will approximate that of the other fairly closely, especially where the viscosity of the mineral oil is comparable to that of the castor oil.

In a manner rather similar to that above described with respect to incorporation of cellulose ethers with castor oil, cellulose ethers may be incorporated with rosin oil or with sperm oil. A lubricant comparable in all details with cellulose ether-castor oil lubricants is not, of course, to be expected when employing either rosin oil or sperm oil in place of castor oil. Also the temperatures at which the cellulose ether is incorporated with the oil may vary somewhat, not only in the case of castor oil when working with varying types of ethers, but also in the case of the sperm oil and rosin oil. In general, it is a safe criterion to employ no higher a temperature for incorporating the cellulose ether in the oil than is necessary to obtain a clear solution of the cellulose ether in the oil. Also, although the cellulose ether may be incorporated with the oil at an elevated temperature without having first given it a preliminary soaking in the oil, it is generally necessary to subject the cellulose ether (when it has not been given a preliminary soaking in the oil) to a higher temperature or for a longer time at the same temperature in order to incorporate it in the oil. Obviously, by such higher or more extended temperature treatment, the cellulose ether may become somewhat degraded or decomposed, which, for some uses is, of course, not desirable, such as where the highest jelly strength is required. However, it is found that the foregoing degradation yields a material in which the jellyfying characteristic has been replaced by greater adhesivity.

I have also found that with the cellulose ether-sperm oil and cellulose ether-rosin oil lubricants, there may be incorporated quantities of mineral oil up to an amount equal to the amount of the sperm oil or rosin oil used, much in the same manner in which mineral oil is incorporated with the cellulose ether-castor oil compositions.

It will also be evident that I may employ a two or three component mixture of castor oil, rosin oil or sperm oil with which to incorporated the cellulose ether, the three oils being mixed before or after incorporation of the cellulose ether therewith in almost any desired proportions. While no particular advantage results from such mixtures, it is possible that those skilled in the art may find some utility therefor. Also, if desired, a quantity of mineral oil within the range above given may be incorporated with compositions resulting from these mixtures.

A few examples of specific lubricants prepared in accordance with my invention are as follows:

(1) *Automobile gear box grease, hub grease, etc.*

Cellulose ether _____ 6 pounds
Castor oil _____ 64 pounds

Swell the cellulose ether in all or part of the castor oil for a period of 15 to 25 hours after which incorporate the ether into the oil by heating at 210° C., cool, masticate, and again masticate with 30 pounds medium grade crank case oil. A clear yellow plastic grease results which does not bleed mineral oil. If the grease is to be used in gear boxes and the like, the corners and crevices of which still contain residual mineral grease, less mineral oil, should be used in compounding the material.

(2) *Solidified oil for instruments, guns, clocks, etc.*

| | |
|---|---|
| Cellulose ether | 2 ounces |
| Sperm oil | 98 ounces |

Swell, incorporate and masticate as in Example (1) except that no mineral oil is added for this particular lubricant. A clear plastic semi-fluid results which retains its shape.

(3) *Vacuum sealing jelly*

| | |
|---|---|
| Cellulose ether | 3 ounces |
| Castor oil | 97 ounces |

Swell, incorporate, and masticate (a) alone, or (b) with 25% mineral oil in the same manner as in Example (1). A clear plastic jelly results which may be smeared around rubber tubes and doubtful joints in vacuum apparatus and machinery, withstands boiling water and will retain its shape when applied.

(4) *Vacuum stop-cock grease*

(a)
| | |
|---|---|
| Cellulose ether | 10 ounces |
| Castor oil | 90 ounces |

Swell overnight, incorporate 210° C. and then hold at 270° C. for 15 minutes, or until cooked. Samples are withdrawn every minute, chilled on a cold surface, dried between finger and thumb until a firm adhesive grease is secured. The finished grease, and indeed all greases intended for vacuum use, should finally be masticated in a high vacuum to remove products which might be produced by cracking during incorporation.

(b)
| | |
|---|---|
| Cellulose ether | 25 ounces |
| Castor oil | 75 ounces |

Swell and incorporate at 210° C.; do not cook. This is an excellent formula for some purposes requiring a rather viscous composition.

(5) *Belt grip adhesive tape etc.*

| | |
|---|---|
| Cellulose ether | 33.3 ounces |
| Castor oil | 66.7 ounces |

Swell, incorporate and cast, a dark brown sticky firm plastic results.

As an example of other cellulose derivatives which may be utilized in carrying out my invention, it may be stated that when part of the acetyl radicals in cellulose triacetate are replaced by stearyl radicals, the cellulose derivatives will swell in castor oil and will dissolve above approximately 160° C. if the stearyl present in this cellulose mixed organic ester amounts to at least 30%. I have, as a matter of fact, found that cellulose acetate stearate containing approximately 37% stearyl makes the firmest and clearest jellies with the greatest variety of oils of any of the cellulose derivatives which I have tried, unless it be cellulose ether. While the cellulose acetate stearate containing only 30% stearyl will not tolerate much mineral oil, I have found that as the percentage of stearyl in the cellulose acetate stearate increases the amount of mineral oil which the composition will tolerate increases almost in relative proportion until the cellulose tristearate is reached, whereupon it will be found that the cellulose tristearate will tolerate mineral oil without the admixture of any castor oil.

As a general rule, the temperatures for incorporation of the oil in the stearate derivatives need not be quite as high as in the case of cellulose ether. For instance, I may incorporate with 10 ounces of cellulose stearate, 90 ounces of mineral oil at approximately 180° C., this incorporation following an initial swelling treatment as preferred with my process. In the case of cellulose acetate stearate containing approximately 37% stearyl from 2 to 5% of the cellulose derivative will produce a very useful lubricating jelly. Many other proportions for various purposes will be apparent to those skilled in the art when following the teachings set forth above in connection with cellulose ethers.

Due to the relatively low decomposition point of cellulose nitrate it will be obvious that one should not employ too high temperatures in the incorporation of oils with cellulose nitrate in the production of useful cellulose nitrate lubricants. For instance, it is not wise to attempt to incorporate cellulose nitrate with castor oil to form a cellulose nitrate lubricant at temperatures much in excess of 100° C., nor can such lubricants be employed at temperatures which greatly exceed 100° C. as the lubricant would decompose. It will suffice to state that it is preferred to produce cellulose nitrate-castor oil lubricants at below 100° C., for instance, 40–50° C., and, preferably, not exceeding 75° C.

The above will also teach those skilled in the art that cellulose acetate can be jellified by admixture thereof with any of the oils named above or known to those skilled in the art which will dissolve or jellify the cellulose acetate without charring or degrading the cellulose derivative. In a similar manner, many of the other cellulose derivatives known to those skilled in the art may be employed, such, for instance, as cellulose propionate, cellulose butyrate, cellulose laurate, and others. It will be apparent, therefore, that one of the features of my invention is the increase of the viscosity of vegetable and mineral oils by the addition thereto of small quantities (less than an equal amount by weight) of a suitable cellulose derivative so that the oil becomes permanently more viscous and will even jellify and gelatinize depending upon the proportion of cellulose derivative which is added. Many variations and modifications of my invention will occur to those skilled in the art and it will be understood that such variations and modifications are intended to be covered by the appended claims when falling within the spirit and scope of the above teachings and disclosure.

What I claim as my invention and desire to be secured by Letters Patent of the United States is:

1. A lubricant comprising the intimate mixture of a relatively small amount of a cellulose ester selected from the group consisting of cellulose stearate and cellulose acetate stearate with a non-drying aliphatic oil.

2. A lubricant comprising the intimate mixture of a relatively small amount of cellulose acetate-stearate with a non-drying aliphatic oil.

3. A lubricant comprising the intimate mixture of a relatively small amount of cellulose stearate with a non-drying aliphatic oil.

4. The process of producing a lubricant which comprises dissolving a cellulose ester selected from the group consisting of cellulose stearate and cellulose acetate stearate in a non-drying aliphatic oil and then permitting the solution to jellify.

5. The process of producing a lubricant which comprises soaking a cellulose ester selected from the group consisting of cellulose stearate and cellulose acetate stearate in a non-drying aliphatic oil and then dissolving the ester in the oil at an elevated temperature.

KENNETH C. D. HICKMAN.